US008942982B2

(12) United States Patent
Izumida et al.

(10) Patent No.: US 8,942,982 B2
(45) Date of Patent: Jan. 27, 2015

(54) SEMICONDUCTOR INTEGRATED CIRCUIT DEVICE AND ELECTRONIC INSTRUMENT

(75) Inventors: Masamichi Izumida, Ryugasaki (JP); Masayuki Murakami, Kokubunji (JP)

(73) Assignee: Seiko Epson Corporation, Tokyo (JP)

( * ) Notice: Subject to any disclaimer, the term of this patent is extended or adjusted under 35 U.S.C. 154(b) by 1709 days.

(21) Appl. No.: 11/979,724

(22) Filed: Nov. 7, 2007

(65) Prior Publication Data

US 2008/0120106 A1 May 22, 2008

(30) Foreign Application Priority Data

Nov. 22, 2006 (JP) ................................ 2006-315658

(51) Int. Cl.

*G10L 13/00* (2006.01)
*G10L 15/00* (2013.01)
*G10L 13/047* (2013.01)

(52) U.S. Cl.

CPC .................................... *G10L 13/047* (2013.01)
USPC .......................................... 704/260; 704/231

(58) Field of Classification Search

CPC ....... G10L 13/043; G10L 13/08; G10L 21/06; G10L 13/033; G10L 13/047
USPC .................................................. 704/231–269
See application file for complete search history.

(56) References Cited

U.S. PATENT DOCUMENTS 4,450,545 A * 5/1984 Kishi et al. .................... 367/198
5,930,752 A * 7/1999 Kawaguchi et al. ....... 704/270.1
6,070,138 A * 5/2000 Iwata ............................ 704/260
6,804,817 B1 * 10/2004 Kimura et al. ................ 719/315
2003/0200858 A1 * 10/2003 Xie ................................ 84/609
2004/0068406 A1 4/2004 Maekawa et al.
2007/0094029 A1 * 4/2007 Saito et al. .................... 704/260

FOREIGN PATENT DOCUMENTS

JP U-57-133100 8/1982
JP A-5-281987 10/1993
JP A 9-6389 1/1997
JP A-9-114488 5/1997
JP A-10-161846 6/1998
JP A-2004-108908 4/2004
JP A-2005-33568 2/2005
JP A-2005-352645 12/2005
WO WO 03/030150 A1 4/2003

* cited by examiner

*Primary Examiner* — Samuel G Neway
(74) *Attorney, Agent, or Firm* — Oliff PLC

(57) ABSTRACT

A semiconductor integrated circuit device including: a storage section which temporarily stores a command and text data input from the outside; a speech synthesis section which synthesizes a speech signal corresponding to the text data based on the command and the text data stored in the storage section, and outputs the synthesized speech signal to the outside; and a control section which controls a timing at which the command and the text data stored in the storage section are transferred to the speech synthesis section based on a speech synthesis start control signal. The control section controls an output of a speech output start notification signal which notifies in advance a start of outputting the synthesized speech signal to the outside based on occurrence of a speech synthesis start event, and then controls a start of outputting the synthesized speech signal to the outside at a given timing.

12 Claims, 9 Drawing Sheets

SEMICONDUCTOR INTEGRATED CIRCUIT DEVICE AND ELECTRONIC INSTRUMENT

Japanese Patent Application No. 2006-315658, filed on Nov. 22, 2006, is hereby incorporated by reference in its entirety.

BACKGROUND OF THE INVENTION

The present invention relates to a semiconductor integrated circuit device and an electronic instrument.

A device which performs a speech synthesis process and a speech recognition process is used in various fields. For example, such a device is utilized to implement the functions of an interactive car navigation system, such as a voice guidance function and a voice command input function for a driver. A related-art speech synthesis device or speech recognition device determines the speech synthesis timing or the speech recognition timing by receiving a command and data transmitted from an external host. Such a speech synthesis device or speech recognition device has an advantage in that speech synthesis or speech recognition can be performed without requiring special control insofar as the command and data are transmitted from the host. JP-A-09-006389 discloses technology in this field, for example.

However, since the speech synthesis timing or the speech recognition timing is not directly controlled using an external control signal, it may be impossible to perform speech synthesis or speech recognition at a timing appropriate for the external environment. As a result, it may be difficult for the user to catch a speech sound, or the speech recognition rate may decrease. Moreover, there may be a case where whether or not the device performs speech synthesis or speech recognition cannot be determined from the outside. Therefore, it may be difficult to develop an application depending on the applied field.

SUMMARY

According to a first aspect of the invention, there is provided a semiconductor integrated circuit device comprising:

a storage section which temporarily stores a command and text data input from the outside;

a speech synthesis section which synthesizes a speech signal corresponding to the text data based on the command and the text data stored in the storage section, and outputs the synthesized speech signal to the outside; and a control section which controls a timing at which the command and the text data stored in the storage section are transferred to the speech synthesis section based on a speech synthesis start control signal.

According to a second aspect of the invention, there is provided a semiconductor integrated circuit device comprising:

a speech synthesis section which synthesizes a speech signal corresponding to text data based on a command and text data input from the outside, and outputs the synthesized speech signal to the outside; and a control section which controls outputting a speech output start notification signal which notifies in advance a start of outputting the synthesized speech signal to the outside based on occurrence of a speech synthesis start event, and then controls a start of outputting the synthesized speech signal to the outside at a given timing.

According to a third aspect of the invention, there is provided a semiconductor integrated circuit device comprising:

a storage section which temporarily stores a command input from the outside;

a speech recognition section which recognizes speech data input from the outside based on the command stored in the storage section; and a control section which controls a timing at which the command stored in the storage section is transferred to the speech recognition section based on a speech recognition start control signal.

According to a fourth aspect of the invention, there is provided a semiconductor integrated circuit device comprising:

a speech recognition section which recognizes speech data input from the outside based on a command input from the outside; and a control section which controls an output of a speech recognition start notification signal which notifies in advance a start of speech recognition by the speech recognition section to the outside based on occurrence of a speech recognition start event, and then controls a start of the speech recognition by the speech recognition section at a given timing.

According to a fifth aspect of the invention, there is provided a semiconductor integrated circuit device comprising:

a storage section which temporarily stores a command and text data input from the outside;

a speech synthesis section which synthesizes a speech signal corresponding to the text data based on the command and the text data relating to a speech synthesis process stored in the storage section, and outputs the synthesized speech signal to the outside;

a speech recognition section which recognizes speech data input from the outside based on the command relating to a speech recognition process stored in the storage section; and a control section which controls a timing at which the command and the text data relating to the speech synthesis process stored in the storage section are transferred to the speech synthesis section based on a speech synthesis start control signal, controls generating a speech output finish signal which indicates the end of the output of the synthesized speech signal based on occurrence of a speech synthesis finish event, and controls a timing at which the command relating to the speech recognition process stored in the storage section is transferred to the speech recognition section based on the speech output finish signal.

According to a sixth aspect of the invention, there is provided an electronic instrument comprising:

any one of the above-described semiconductor integrated circuit devices;

means which receives input information; and means which outputs a result of a process performed by the semiconductor integrated circuit device based on the input information.

DETAILED DESCRIPTION OF THE EMBODIMENT

Figure 1:
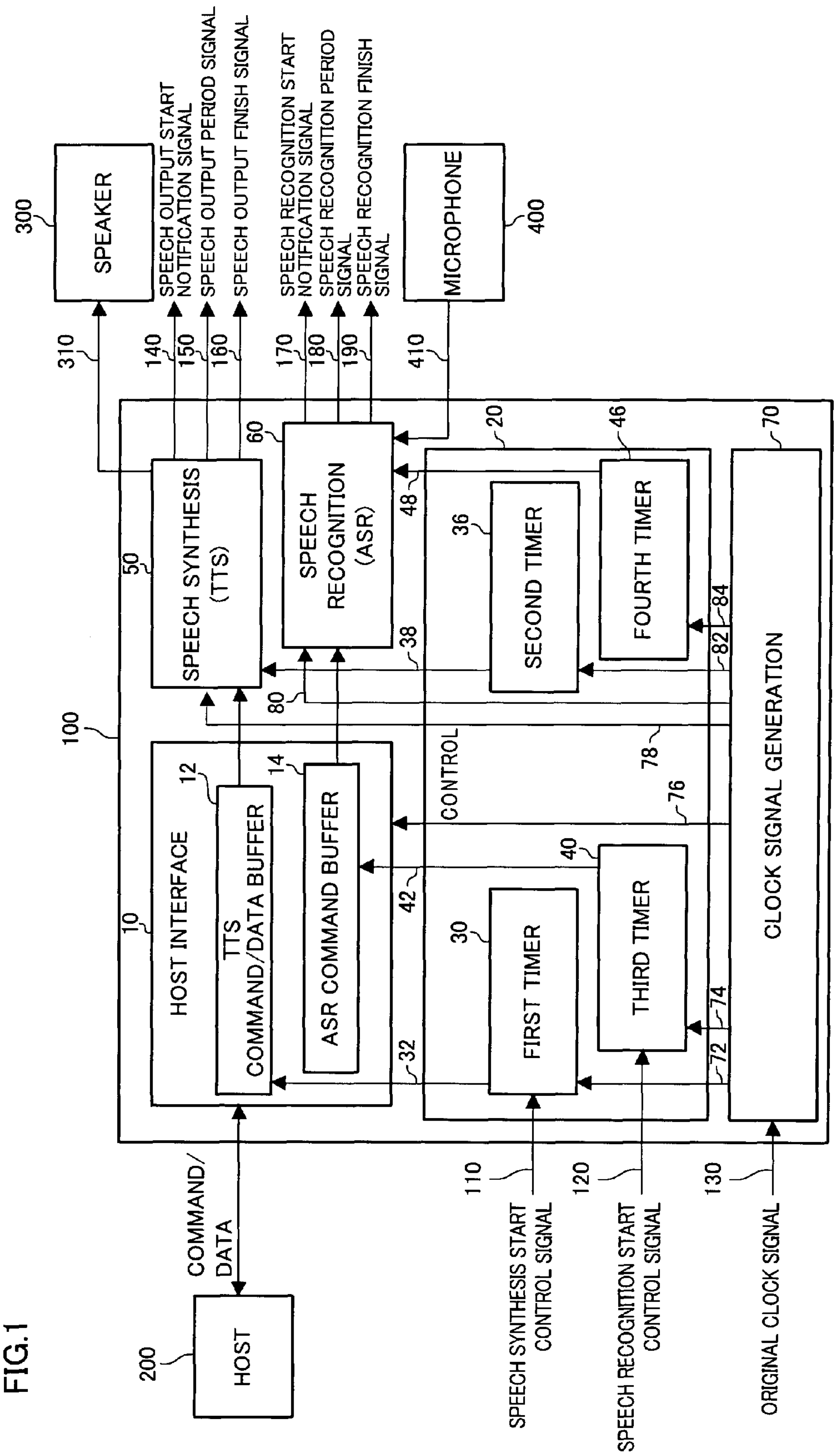
FIG. 1 is a functional block diagram of a semiconductor integrated circuit device according to one embodiment of the invention.

The invention may provide a highly convenient semiconductor integrated circuit device which can perform a speech synthesis process or a speech recognition process in liaison with the user, a peripheral device, and the like, such as allowing externally control of the operation timing of the speech recognition process or the speech synthesis process or giving advance notice of start of the speech recognition process or the speech synthesis process.

(1) According to one embodiment of the invention, there is provided a semiconductor integrated circuit device comprising:

a storage section which temporarily stores a command and text data input from the outside;

a speech synthesis section which synthesizes a speech signal corresponding to the text data based on the command and the text data stored in the storage section, and outputs the synthesized speech signal to the outside; and a control section which controls a timing at which the command and the text data stored in the storage section are transferred to the speech synthesis section based on a speech synthesis start control signal.

The command input from the outside includes instructions for the speech synthesis section, such as directing the speech synthesis section to start the speech synthesis process or directing the speech synthesis section to write phoneme segment data necessary for speech synthesis into an internal memory.

The storage section may be configured as a buffer using a flip-flop, or may be a random access memory (RAM), for example.

The speech synthesis section may restore and reproduce a speech signal compressed and encoded using a method such as Adaptive Differential Pulse Code Modulation (ADPCM), MPEG-1 Audio Layer-3 (MP3), or Advanced Audio Coding (AAC), or may perform a text-to-speech (TTS) type speech synthesis process in which a corresponding speech sound is synthesized from text data. The TTS method may be a parametric method, a concatenative method, or a corpus base method. In the parametric method, a human speech process is modeled to synthesize a speech sound. In the concatenative method, phoneme segment data formed of actual human speech data is provided, and a speech sound is synthesized while optionally combining the phoneme segment data and partially modifying the boundaries. The corpus base method is developed from the concatenative method, in which a speech sound is assembled from language-based analysis, and a synthesized speech sound is formed from the actual speech data. These methods require a dictionary (database) for conversion from text representation using a SHIFT-JIS code or the like into "reading" to be pronounced before converting text into sound. The concatenative method and the corpus base method also require a dictionary (database) from "reading" to "phoneme".

The speech synthesis section may be implemented as hardware such as a dedicated circuit, or may be implemented as software which operates on a general-purpose CPU.

The speech synthesis start control signal is used to direct the timing at which the speech synthesis section starts speech synthesis and speech output (utterance) from the outside. An external host may generate the speech synthesis start control signal, or the user may generate the speech synthesis start control signal by pressing a specific button. If the external host generates the speech synthesis start control signal each time the external host completely transmits the text data corresponding to a series of sentences, the series of sentences is read out without being interrupted unnaturally, and an appropriate silent period can be inserted between the sentences. When the user generates the speech synthesis start control signal, production of a speech sound can be delayed until the user prepares for catching a speech sound. Moreover, since the speech synthesis start control signal can be generated without the external host, the load of the external host can be reduced.

For example, when the semiconductor integrated circuit device alternately performs speech synthesis and speech recognition, a signal indicating completion of speech recognition may be used as the speech synthesis start control signal. In this case, since the semiconductor integrated circuit device can start the next speech output after completion of speech recognition, a situation in which the semiconductor integrated circuit device erroneously recognizes a speech sound produced by the semiconductor integrated circuit device can be prevented.

The control section may include a first timer for measuring a given time after the speech synthesis start control signal has been input, and may cause the command and the text data stored in the storage section to be transferred to the speech synthesis section after the first timer has measured the given time. In this case, if the first timer measures a time sufficient for the text data corresponding to a series of sentences which should be collectively read out to be completely stored in the storage section, taking into account the transmission rate between the semiconductor integrated circuit device and the host and the load of the host, a situation can be prevented in which the speech sound corresponding to the sentence is output while being interrupted unnaturally. The first timer may be a counter using a flip-flop which measures the given time by counting up or down in synchronization with a specific clock signal until a specific number is reached. For example, the first timer may be an up-counter which is initialized to zero when the speech synthesis start control signal has been input, then counts up, and generates a control signal for transferring the command and the text data stored in the storage section to the speech synthesis section when a specific number corresponding to the given time has been reached, or may be a down-counter which is initialized to a specific number corresponding to the given time when the speech synthesis start control signal has been input, then counts down, and generates a control signal for transferring the command and the text data stored in the storage section to the speech synthesis section when the count value has reached zero.

The control section may cause the command and the text data stored in the storage section to be transferred to the speech synthesis section when the control section has detected that the final text data corresponding to a series of sentences which should be collectively read out has been stored in the storage section.

The control section may be implemented as hardware such as a dedicated circuit, or may be implemented as software which operates on a general-purpose CPU.

According to this embodiment, the timing at which the speech synthesis section starts the speech synthesis process and speech output can be delayed until the speech synthesis start control signal is input or a specific time expires after the speech synthesis start control signal has been input. Therefore, the user or the external host can perform various operations before the speech synthesis section starts the speech synthesis process by appropriately setting the time from the input of the speech synthesis start control signal to the start of speech synthesis and speech output.

For example, the start of the speech synthesis process and speech output by the speech synthesis section can be delayed by preventing a command which directs start of speech synthesis (speech synthesis start command) and the entire text data corresponding to specific sentence (e.g., "Please answer by yes or no") to be synthesized and output as a speech sound from being transferred to the speech synthesis section until the speech synthesis start command and the entire text data are stored in the storage section. For example, even if the transmission rate between the semiconductor integrated circuit device and the host is low or transmission of the text data is interrupted due to a temporary increase in CPU load of the external host, a specific sentence can be read out without being interrupted since the start of the speech synthesis process and speech output can be delayed until the speech synthesis start command and the entire text data are stored in the storage section. For example, when the user generates the speech synthesis start control signal by pressing a button, the user can appropriately prepare for catching a speech sound before the semiconductor integrated circuit device according to this embodiment starts speech output.

(2) According to one embodiment of the invention, there is provided a semiconductor integrated circuit device comprising:

a speech synthesis section which synthesizes a speech signal corresponding to text data based on a command and text data input from the outside, and outputs the synthesized speech signal to the outside; and a control section which controls outputting a speech output start notification signal which notifies in advance a start of outputting the synthesized speech signal to the outside based on occurrence of a speech synthesis start event, and then controls a start of outputting the synthesized speech signal to the outside at a given timing.

The speech synthesis start event may be generated when the speech synthesis start command or the first text data has been transferred from the storage section to the speech synthesis section, or may be externally generated at a given timing.

The control section may control the speech synthesis section to start the speech synthesis process at a given timing after occurrence of the speech synthesis start event and immediately output the synthesized speech signal to the outside, or may control the speech synthesis section to immediately start the speech synthesis process after occurrence of the speech synthesis start event and start to output the synthesized speech signal to the outside at a given timing.

The control section may include a second timer for measuring a given time after occurrence of the speech synthesis start event, and may control the speech synthesis section to start to output the synthesized speech signal to the outside after the second timer has measured the given time. In this case, if the second timer measures a time sufficient for by the peripheral device or the like to reduce the volume and the user to prepare for listening to a speech sound, the user can easily catch a speech sound output from the speech synthesis section. The second timer may be a counter using a flip-flop which measures the given time by counting up or down in synchronization with a specific clock signal until a specific number is reached. For example, the second timer may be an up-counter which is initialized to zero when the speech synthesis start event has occurred, then counts up, and generates a control signal for causing the speech synthesis section to start to output the synthesized speech signal to the outside when a specific number corresponding to the given time has been reached, or may be a down-counter which is initialized to a specific number corresponding to the given time when the speech synthesis start event has occurred, then counts down, and generates a control signal for causing the speech synthesis section to start to output the synthesized speech signal to the outside when the count value has reached zero.

The control section may control the speech synthesis section to start to output the synthesized speech signal to the outside when a signal which directs the start of speech output from the outside has been input. The signal which directs the start of speech output from the outside may be a signal which indicates that the volume of the peripheral device has been reduced, or a signal which is manually input by the user when the user has prepared for catching a speech sound.

According to this embodiment, the timing at which the speech synthesis section starts to output the speech signal can be delayed until a specific time expires after the speech output start notification signal has been output based on occurrence of the speech synthesis start event. Therefore, the user, the external peripheral device, or the like can perform various operations before the semiconductor integrated circuit device according to this embodiment starts to output the speech signal by detecting the speech output start notification signal, by appropriately setting the time from the output of the speech output start notification signal to the start of speech output. For example, since the peripheral device (e.g., air conditioner or audio device) can reduce the volume or the user can prepare for catching a speech sound utilizing the speech output start notification signal, the user can easily catch a speech sound by causing the speech synthesis section to output the synthesized speech signal at a given timing after the speech output start notification signal has been output. For example, the speech output start notification signal may be connected to an LED, and the user may manually reduce the volume of the peripheral audio device or the like in response to the blinking operation of the LED based on the speech output start notification signal before the semiconductor integrated circuit device according to this embodiment outputs an alert sound. This allows the user to reliably listen to the alert sound.

(3) In the semiconductor integrated circuit device shown in above (1), the control section may control outputting a speech output start notification signal which notifies in advance a start of outputting the synthesized speech signal to the outside based on occurrence of a speech synthesis start event, and then control a start of outputting the synthesized speech signal to the outside at a given timing.

According to this feature, the timing at which the speech synthesis section starts the speech synthesis process and starts to output the speech signal can be delayed until the speech synthesis start control signal is input or a specific time expires after the speech synthesis start control signal has been input. Moreover, the timing at which the speech synthesis section starts to output the speech signal can be delayed until a specific time expires after the speech output start notification signal has been output based on occurrence of the speech synthesis start event. These processes can be controlled independently.

(4) In the semiconductor integrated circuit device shown in above (2) or (3), the control section may control an output of a speech output period signal which indicates a period from the start to the end of the output of the synthesized speech signal to the outside.

According to this feature, whether or not the semiconductor integrated circuit device is outputting a speech sound can be determined from the outside utilizing the speech output period signal. For example, when connecting the speech output period signal to an LED, since the light-on state or the light-off state of the LED can be visually checked, the user can easily determine whether or not the semiconductor integrated circuit device is outputting a speech sound, even if the volume is low or muted. For example, when the semiconductor integrated circuit device alternately performs speech synthesis and speech recognition, the semiconductor integrated circuit device may not perform the speech recognition process during a period in which the semiconductor integrated circuit device outputs the speech output period signal, even if an instruction which directs the start of speech recognition is input from the outside. In this case, since the semiconductor integrated circuit device does not perform speech recognition during speech output, a situation in which the semiconductor integrated circuit device erroneously recognizes a speech sound produced by the semiconductor integrated circuit device can be prevented.

(5) In the semiconductor integrated circuit device shown in any one of above (1) to (4), the control section may control an output of a speech output finish signal which indicates the end of the output of the synthesized speech signal to the outside based on occurrence of a speech synthesis finish event.

The speech synthesis finish event may be generated when the speech synthesis section has finished synthesizing and outputting a speech sound corresponding to the final text data, or may be generated when a given time sufficient for the speech synthesis section to synthesize and output a speech sound corresponding to the final text data has expired after the speech synthesis start event has occurred, for example.

According to this feature, completion of speech output can be determined from the outside utilizing the speech output finish signal. Therefore, the peripheral device (e.g., air conditioner or audio device) can return to the state before reducing the volume utilizing the speech output finish signal, for example. For example, when the semiconductor integrated circuit device alternately performs speech synthesis and speech recognition, the speech output finish signal may be used as a signal which directs the start of the speech recognition process. In this case, since the semiconductor integrated circuit device can start the next speech recognition after completion of speech synthesis, a situation in which the semiconductor integrated circuit device erroneously recognizes a speech sound produced by the semiconductor integrated circuit device can be prevented.

(6) According to one embodiment of the invention, there is provided a semiconductor integrated circuit device comprising:

a storage section which temporarily stores a command input from the outside;

a speech recognition section which recognizes speech data input from the outside based on the command stored in the storage section; and a control section which controls a timing at which the command stored in the storage section is transferred to the speech recognition section based on a speech recognition start control signal.

The command input from the outside includes instructions for the speech recognition section, such as directing the speech recognition section to start the speech recognition process, directing the speech recognition section to recognize only a specific word (e.g., “yes” and “no”), or directing the speech recognition section to recognize in specific language (e.g., English).

The storage section may be configured as a buffer using a flip-flop, or may be a RAM, for example.

The speech recognition section may perform the speech recognition process for a specific speaker, or may perform the speech recognition process for an unspecified speaker. In the former case, the recognition rate can be easily increased. However, since data of each speaker must be collected in advance (may be called “training”), the burden on the user is increased. In the latter case, convenience is increased since the semiconductor integrated circuit device can be immediately used for any person. However, since the information relating to the speaker cannot be stored in advance, the recognition rate decreases. Therefore, the speech recognition process is performed while limiting vocabulary. In order to specify the user by speech recognition for an unspecified speaker, the speaker registers a keyword in the system in advance, for example. The system displays a question for deriving the keyword on the screen, and the speaker answers by saying “yes” or “no” (or, “1”, “2”, “3”, or “4”). This process is repeated to determine whether or not the speaker knows the registered keyword, whereby the system recognizes the speaker. In such a system, since it suffices that only the speech sound “yes” or “no” (or, “1”, “2”, “3”, or “4”) be recognized, the recognition rate is increased, and cost can be significantly reduced. Therefore, such a system is suitable for an LSI. Moreover, another person cannot identify the keyword, even if that person overhears the answer, by changing the question from the system or the choices of answer for the speaker each time the above process is performed, whereby sufficient security can be ensured. This may be implemented by causing the external host to transmit a command for setting the choices of answer (word to be recognized as a speech sound) in a small-scale internal memory of the speech recognition section each time the above process is performed.

The speech recognition section may be implemented as hardware such as a dedicated circuit, or may be implemented as software which operates on a general-purpose CPU.

The speech recognition start control signal is used to adjust the timing at which the speech recognition section starts speech recognition from the outside. The external host may generate the speech recognition start control signal, or the user may generate the speech recognition start control signal by pressing a specific button. When the external host generates the speech recognition start control signal, a situation in which the external host cannot process the speech recognition results and malfunctions can be prevented by causing the external host to generate the speech recognition start control signal each time the external host becomes ready to analyze the speech recognition results. When the user generates the speech recognition start control signal, the start of speech recognition can be delayed until the user prepares for speech.

Moreover, since the speech recognition start control signal can be generated without the external host, the load of the external host can be reduced.

For example, when the semiconductor integrated circuit device alternately performs speech synthesis and speech recognition, a signal indicating completion of speech output may be used as the speech recognition start control signal. In this case, since the semiconductor integrated circuit device can start the next speech recognition after completion of speech synthesis, a situation in which the semiconductor integrated circuit device erroneously recognizes a speech sound produced by the semiconductor integrated circuit device can be prevented.

The control section may include a third timer for measuring a given time after the speech recognition start control signal has been input, and may cause the command stored in the storage section to be transferred to the speech recognition section after the third timer has measured the given time. In this case, if the third timer measures a time sufficient for all the commands necessary for speech recognition to be stored in the storage section, taking into account the transmission rate between the semiconductor integrated circuit device and the host and the load of the host, erroneous speech recognition can be prevented. If the third timer measures an appropriate time for the user to finish preparing for speech after the speech recognition start control signal has been input, the speech recognition section can immediately enters a speech recognition enable state so that the probability that a speech sound of a person other than the user is recognized can be reduced. Moreover, since the speech recognition section can immediately enters a speech recognition enable state, unnecessary current consumption can be suppressed. The third timer may be a counter using a flip-flop which measures the given time by counting up in synchronization with a specific clock signal until a specific number is reached. For example, the third timer may be an up-counter which is initialized to zero when the speech recognition start control signal has been input, then counts up, and generates a control signal for transferring the command stored in the storage section to the speech recognition section when a specific number corresponding to the given time has been reached, or may be a down-counter which is initialized to a specific number corresponding to the given time when the speech recognition start control signal has been input, then counts down, and generates a control signal for transferring the command stored in the storage section to the speech recognition section when the count value has reached zero.

The control section may cause the command stored in the storage section to be transferred to the speech recognition section when the control section has detected that all the commands necessary for speech recognition have been stored in the storage section.

The control section may be implemented as hardware such as a dedicated circuit, or may be implemented as software which operates on a general-purpose CPU.

According to this embodiment, the timing at which the speech recognition section starts the speech recognition process can be delayed until the speech recognition start control signal is input or a specific time expires after the speech recognition start control signal has been input. Therefore, the user or the external host can perform various operations before the speech recognition section starts the speech recognition process by appropriately setting the time from the input of the speech recognition start control signal to the start of speech recognition.

For example, the timing at which the speech recognition section starts the speech recognition process can be delayed by preventing the command from being transferred to the speech recognition section until a command which directs the start of speech recognition (speech recognition start command) is stored in the storage section. For example, even if the transmission rate between the semiconductor integrated circuit device and the host is low or transmission of the command is interrupted due to a temporary increase in CPU load of the external host, since the start of the speech recognition process can be delayed until all the commands are stored in the storage section, erroneous speech recognition can be prevented. Moreover, since the control section transfers the speech recognition start command to the speech recognition section after a time sufficient for the user to prepare for speech recognition has expired after the speech recognition start control signal has been input, the speech recognition start timing can be appropriately adjusted. Therefore, the speech recognition process in a period in which the user rarely produces a speech sound can be suppressed, whereby the CPU can be prevented from being unnecessarily used, or current consumption can be reduced.

(7) According to one embodiment of the invention, there is provided a semiconductor integrated circuit device comprising:

a speech recognition section which recognizes speech data input from the outside based on a command input from the outside; and a control section which controls an output of a speech recognition start notification signal which notifies in advance a start of speech recognition by the speech recognition section to the outside based on occurrence of a speech recognition start event, and then controls a start of the speech recognition by the speech recognition section at a given timing.

The speech recognition start event may be generated when the speech recognition start command has been transferred from the storage section to the speech recognition section, or may be externally generated at a given timing.

The control section may include a fourth timer for measuring a given time after occurrence of the speech recognition start event, and may control the speech recognition section to start to speech recognition after the fourth timer has measured the given time. In this case, if the fourth timer measures a time sufficient for the peripheral device or the like to reduce the volume and the user to prepare for speech, the speech recognition rate of the speech recognition section can be increased. The fourth timer may be a counter using a flip-flop which measures the given time by counting up or down in synchronization with a specific clock signal until a specific number is reached. For example, the fourth timer may be an up-counter which is initialized to zero when the speech recognition start event has occurred, then counts up, and generates a control signal for causing the speech recognition section to start speech recognition when a specific number corresponding to the given time has been reached, or may be a down-counter which is initialized to a specific number corresponding to the given time when the speech recognition start event has occurred, then counts down, and generates a control signal for causing the speech recognition section to start speech recognition when the count value has reached zero.

The control section may control the speech recognition section to start speech recognition when a signal which directs the start of speech recognition has been input from the outside. The signal which directs the start of speech recognition from the outside may be a signal which indicates that the volume of the peripheral device has been reduced, or a signal which is manually input by the user when the user has prepared for speech.

According to this embodiment, the timing at which the speech recognition section starts speech recognition can be delayed until a specific time expires after the speech recognition start notification signal has been output based on occurrence of the speech recognition start event. Therefore, since the peripheral device (e.g., air conditioner or audio device) can reduce the volume or the user can prepare for speech utilizing the speech recognition start notification signal, the speech recognition rate can be increased by causing the speech recognition section to start speech recognition at a given timing after outputting the speech recognition start notification signal.

(8) In the semiconductor integrated circuit device shown in above (6), the control section may control an output of a speech recognition start notification signal which notifies in advance a start of speech recognition by the speech recognition section to the outside based on occurrence of a speech recognition start event, and then control a start of the speech recognition by the speech recognition section at a given timing.

According to this feature, the timing at which the speech recognition section starts the speech recognition process can be delayed until the speech recognition start control signal is input or a specific time expires after the speech recognition start control signal has been input. Moreover, the timing at which the speech recognition section starts speech recognition can be delayed until a specific time expires after the speech recognition section has output the speech recognition start notification signal based on occurrence of the speech recognition start event. These processes can be controlled independently.

(9) In the semiconductor integrated circuit device shown in above (7) or (8), the control section may control an output of a speech recognition period signal which indicates a period from the start to the end of the speech recognition by the speech recognition section to the outside.

According to this feature, whether or not the semiconductor integrated circuit device is performing speech recognition can be determined from the outside utilizing the speech recognition period signal. For example, when connecting the speech recognition period signal to an LED, since the light-on state or the light-off state of the LED can be visually checked, the user can easily determine whether or not the semiconductor integrated circuit device is performing speech recognition. For example, when the semiconductor integrated circuit device alternately performs speech synthesis and speech recognition, the semiconductor integrated circuit device may not perform the speech synthesis process during a period in which the speech recognition period signal is output, even if an instruction which directs the start of speech synthesis is input from the outside. In this case, since the semiconductor integrated circuit device does not perform speech synthesis and speech output during speech recognition, a situation in which the semiconductor integrated circuit device erroneously recognizes a speech sound produced by the semiconductor integrated circuit device can be prevented.

(10) In the semiconductor integrated circuit device shown in any one of above (6) to (9), the control section may control an output of a speech recognition finish signal which indicates the end of the speech recognition by the speech recognition section to the outside based on occurrence of a speech recognition finish event.

The speech recognition finish event may be generated when the speech recognition section has recognized a word which should be recognized as a speech sound, or may be generated when a specific time has expired after the speech recognition start event has occurred. In the latter case, since speech recognition is finished when a specific time has expired, even if the user does not produce a speech sound for a long time, the CPU can be prevented from being unnecessarily used, or current consumption can be reduced.

According to this feature, the completion of speech recognition can be determined from the outside utilizing the speech recognition finish signal. Therefore, the peripheral device (e.g., air conditioner or audio device) can return to the state before reducing the volume utilizing the speech recognition finish signal, for example. For example, when the semiconductor integrated circuit device alternately performs speech recognition and speech synthesis, the speech recognition finish signal may be used as a signal which directs the start of the speech synthesis process. In this case, since the semiconductor integrated circuit device can start the next speech output after the completion of speech recognition, a situation in which the semiconductor integrated circuit device erroneously recognizes a speech sound produced by the semiconductor integrated circuit device can be prevented.

(11) According to one embodiment of the invention, there is provided a semiconductor integrated circuit device comprising:

a storage section which temporarily stores a command and text data input from the outside;

a speech synthesis section which synthesizes a speech signal corresponding to the text data based on the command and the text data relating to a speech synthesis process stored in the storage section, and outputs the synthesized speech signal to the outside;

a speech recognition section which recognizes speech data input from the outside based on the command relating to a speech recognition process stored in the storage section; and a control section which controls a timing at which the command and the text data relating to the speech synthesis process stored in the storage section are transferred to the speech synthesis section based on a speech synthesis start control signal, controls generating a speech output finish signal which indicates the end of the output of the synthesized speech signal based on occurrence of a speech synthesis finish event, and controls a timing at which the command relating to the speech recognition process stored in the storage section is transferred to the speech recognition section based on the speech output finish signal.

According to this embodiment, since the speech synthesis section outputs the speech output finish signal when finishing the speech synthesis process and output of the synthesized speech signal, the speech recognition section can reliably start speech recognition after completion of speech output by transferring the command relating to the speech recognition process stored in the storage section to the speech recognition section based on the speech output finish signal. This prevents a malfunction of the system which occurs when the speech recognition section erroneously recognizes the speech sound produced from a speaker or the like based on the speech signal output from the speech synthesis section and transfers wrong recognition results to the external host.

According to this embodiment, after starting the speech synthesis process using the input of the speech synthesis start control signal as a trigger, the speech recognition process can be automatically started after completion of the speech synthesis process. This makes it unnecessary for the external host to take part in the transition from the speech synthesis process to the speech recognition process, whereby the load of the external host can be reduced. Moreover, the speech synthesis process and the speech recognition process can be more easily combined.

(12) According to one embodiment of the invention, there is provided an electronic instrument comprising:

any one of the above-described semiconductor integrated circuit devices;

means which receives input information; and means which outputs a result of a process performed by the semiconductor integrated circuit device based on the input information.

The embodiments of the invention will be described in detail below, with reference to the drawings. Note that the embodiments described below do not in any way limit the scope of the invention laid out in the claims herein. In addition, not all of the elements of the embodiments described below should be taken as essential requirements of the invention.

1. Semiconductor Integrated Circuit Device

FIG. 1 is a functional block diagram of a semiconductor integrated circuit device according to this embodiment.

A semiconductor integrated circuit device 100 according to this embodiment includes a host interface section 10. The host interface section 10 controls communication of a command relating to a speech synthesis process or a speech recognition process, text data, and speech recognition result data with a host 200 in synchronization with a clock signal 76 generated by a clock signal generation section 70. The host interface section 10 includes a TTS command/data buffer 12 which functions as a storage section which temporarily stores a command (TTS command) relating to the speech synthesis process and text data. The host interface section 10 also includes an ASR command buffer 14 which functions as a storage section which temporarily stores a command (automatic speech recognition (ASR) command) relating to the speech recognition process.

The semiconductor integrated circuit device 100 according to this embodiment includes a control section 20.

The control section 20 controls the timing at which the command and the data stored in the TIS command/data buffer 12 are transferred to a speech synthesis section 50 based on a speech synthesis start control signal 110. The control section 20 may include a first timer 30 for managing this timing. Specifically, the first timer 30 counts up or down in synchronization with a clock signal 72 generated by the clock signal generation section 70 until a specific count value set in advance is reached, and generates a control signal 32 for transferring the command and the data stored in the TTS command/data buffer 12 to the speech synthesis section 50 when the specific count value has been reached. The first timer 30 may be implemented by hardware as a counter circuit using a flip-flop, or may be implemented by software, for example. The first timer 30 manages the timing at which the TTS command and the text data are transferred to the speech synthesis section 50 after the speech synthesis start control signal 110 has been input.

The control section 20 also controls the timing at which the command stored in the ASR command buffer 14 is transferred to a speech recognition section 60 based on a speech recognition start control signal 120. The control section 20 may include a third timer 40 for managing this timing. Specifically, the third timer 40 counts up or down in synchronization with a clock signal 74 generated by the clock signal generation section 70 until a specific count value set in advance is reached, and generates a control signal 42 for transferring the command stored in the ASR command buffer 14 to the speech recognition section 60 when the specific count value has been reached. The third timer 40 may be implemented by hardware as a counter circuit using a flip-flop, or may be implemented by software, for example. The third timer 40 manages the timing at which the ASR command is transferred to the speech synthesis section 60 after the speech recognition start control signal 120 has been input.

The control section 20 may include a second timer 36. The second timer 36 controls the timing at which the speech synthesis section 50 starts to output a speech signal 310 and a speech output period signal 150 after outputting a speech output start notification signal 140. Specifically, the second timer 36 counts up or down in synchronization with a clock signal 82 generated by the clock signal generation section 70 until a specific count value set in advance is reached when the first text data has been transferred from the TTS command/data buffer 12 to the speech synthesis section 50 as a speech synthesis start event, and generates a control signal 38 for starting output of the speech output period signal 150 when the specific count value has been reached, for example. The second timer 36 may be implemented by hardware as a counter circuit using a flip-flop, or may be implemented by software, for example.

The control section 20 controls the speech synthesis section 50 to output a speech output finish signal 160 after finishing outputting the speech output period signal 150 when the speech synthesis section 50 has started to output the speech output period signal 150 based on the control signal output from the second timer 36 and has finished outputting the speech signal corresponding to the final text data as a speech synthesis finish event, for example.

The control section 20 may include a fourth timer 46. The fourth timer 46 controls the timing at which output of a speech recognition period signal 180 is started after a speech recognition start notification signal 170 has been output. Specifically, the fourth timer 46 counts up or down in synchronization with a clock signal 84 generated by the clock signal generation section 70 until a specific count value set in advance is reached when the ASR command which directs the start of speech recognition has been transferred from the ASR command buffer 14 to the speech recognition section 60 as a speech recognition start event, and generates a control signal 48 for starting output of the speech recognition period signal 180 when the specific count value has been reached. The fourth timer 46 may be implemented by hardware as a counter circuit using a flip-flop, or may be implemented by software, for example.

The control section 20 controls the speech recognition section 60 to output a speech recognition finish signal 190 after finishing outputting the speech recognition period signal 180 when the speech recognition section 60 has started to output the speech recognition period signal 180 based on the control signal output from the fourth timer 46 and has recognized a specific word (e.g., "yes" or "no") set in advance as a speech recognition finish event, for example.

The semiconductor integrated circuit device 100 according to this embodiment includes the speech synthesis section 50. The speech synthesis section 50 synthesizes a speech signal corresponding to text data based on the TTS command and the text data transferred from the TTS command/data buffer 12 in synchronization with a clock signal 78 generated by the clock signal generation section 70, and outputs the synthesized speech signal 310 to an externally connected speaker 300. The speech synthesis section 50 outputs the speech output start notification signal 140 when the first text data has been transferred from the TTS command/data buffer 12 to the speech synthesis section 50 as the speech synthesis start event, for example. The entire function of the speech synthesis section 50 may be implemented by either hardware or software.

The semiconductor integrated circuit device 100 according to this embodiment includes the speech recognition section 60. The speech recognition section 60 recognizes a speech signal 410 input from an externally connected microphone 400 based on the ASR command transferred from the ASR command buffer 14 in synchronization with a clock signal 80 generated by the clock signal generation section 70, and transmits the speech recognition result data to the host 200 through the host interface 10. The speech recognition section 60 outputs the speech recognition start notification signal 170 when the ASR command which directs the start of speech recognition has been transferred from the ASR command buffer 14 to the speech recognition section 60 as the speech recognition start event, for example. The entire function of the speech recognition section 60 may be implemented by either hardware or software.

The semiconductor integrated circuit device 100 according to this embodiment includes the clock signal generation section 70. The clock signal generation section 70 generates the clock signals 72, 74, 76, 78, 80, 82, and 84 from an original clock signal 130 input from the outside.

Figure 2:
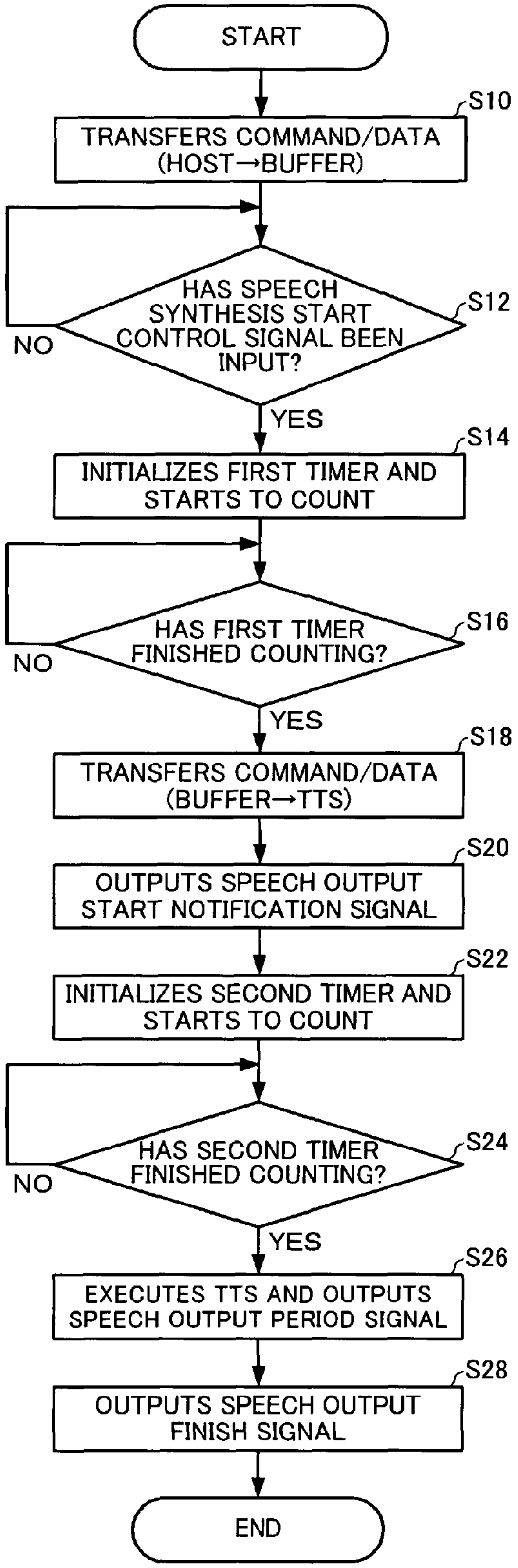
FIG. 2 is a flowchart illustrative of the execution flow of a speech synthesis process of a semiconductor integrated circuit device according to one embodiment of the invention.

FIG. 2 is a flowchart illustrative of the execution flow of the speech synthesis process of the semiconductor integrated circuit device according to this embodiment.

The execution flow of the speech synthesis process of the semiconductor integrated circuit device 100 according to this embodiment is described below with reference to FIGS. 1 and 2.

The host 200 transmits the command relating to the speech synthesis process to the semiconductor integrated circuit device 100 through the host interface, and transmits the text data converted into speech. The semiconductor integrated circuit device 100 stores the command and the text data in the TTS command/data buffer 12 (step S10).

The semiconductor integrated circuit device 100 waits for the speech synthesis start control signal 110 to be input from the outside (step S12). When the speech synthesis start control signal 110 has been input, the control section 20 initializes the first timer 30 and starts to count up or down (step S14).

When the count value of the first timer 30 has reached a specific value set in advance (step S16), the command and the text stored in the TTS command/data buffer 12 are transferred to the speech synthesis section 50 (step S18), and the speech synthesis section 50 outputs the speech output start notification signal 140 (step S20).

After outputting the speech output start notification signal 140, the speech synthesis section 50 initializes the second timer 36 and starts to count up or down (step S22).

When the count value of the second timer 36 has reached a specific value set in advance (step S24), the speech synthesis section 50 starts to output the speech output period signal 150, starts the speech synthesis process, and starts to output the synthesized speech signal to the speaker 300. When the speech synthesis section 50 has finished outputting the speech signal corresponding to the final text data to the speaker 300, for example, the speech synthesis section 50 finishes outputting the speech output period signal 150 (step S26).

When the speech synthesis section 50 has finished outputting the speech signal corresponding to the final text data, for example, the speech synthesis section 50 outputs the speech output finish signal 160 (step S28).

Figure 3:
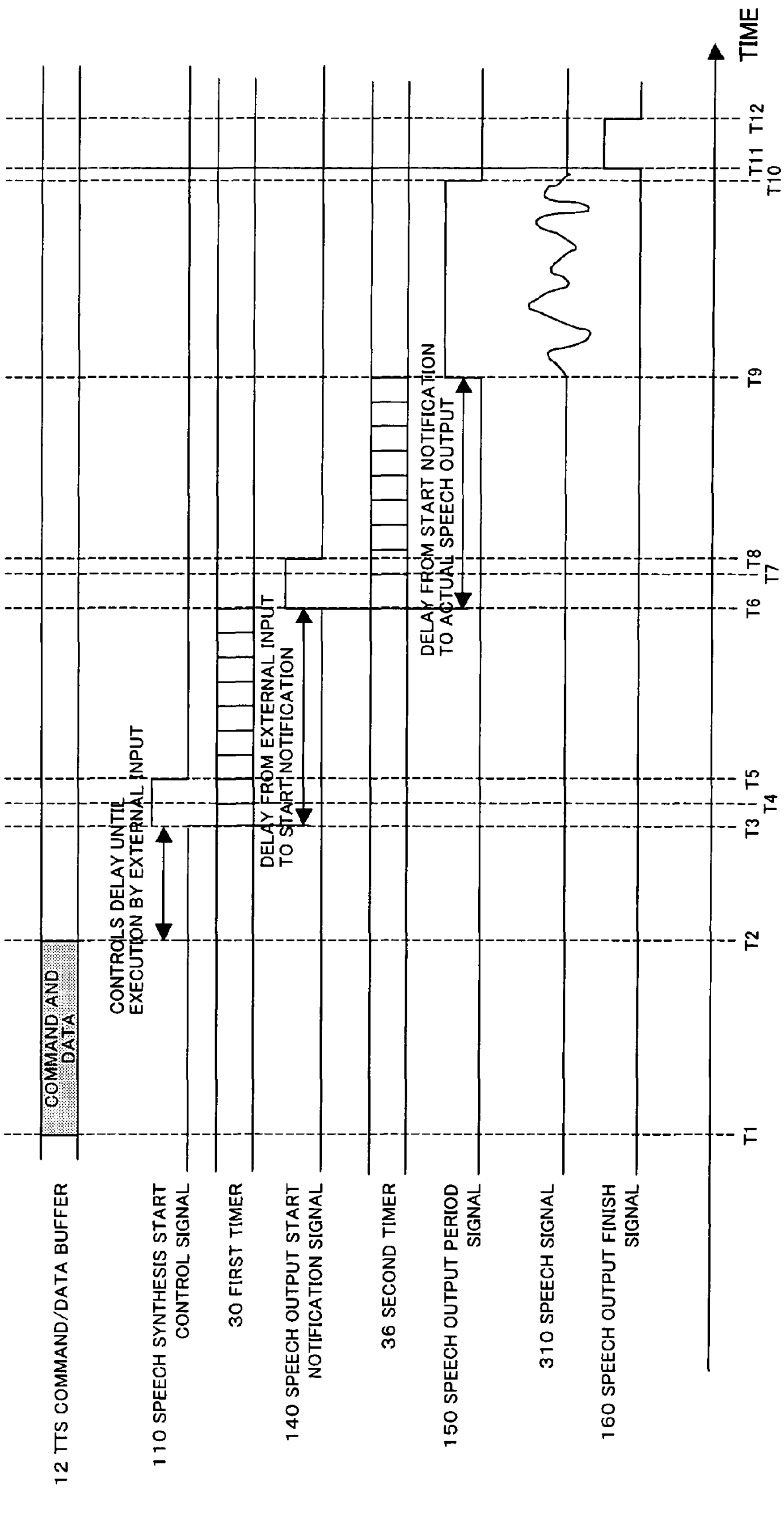
FIG. 3 is a timing chart illustrative of the generation timing of each signal during a speech synthesis process of a semiconductor integrated circuit device according to one embodiment of the invention.

FIG. 3 is a timing chart illustrative of the generation timing of each signal during the speech synthesis process of the semiconductor integrated circuit device according to this embodiment.

The generation timing of each signal during the speech synthesis process of the semiconductor integrated circuit device 100 according to this embodiment is described below with reference to FIGS. 1 and 3.

At times T1 and T2, the host 200 transmits the command relating to the speech synthesis process to the semiconductor integrated circuit device 100 through the host interface, and transmits the text data to be converted into speech. The semiconductor integrated circuit device 100 stores the command and the text data in the TTS command/data buffer 12.

When the speech synthesis start control signal 110 input from the outside rises at a time T3, the first timer 30 is initialized at a time T4.

The speech synthesis start control signal 110 falls at a time T5, whereby the first timer 30 starts to count up or down.

When the count value of the first timer 30 has reached a specific value set in advance at a time T6, the command and the text stored in the TTS command/data buffer 12 are transferred to the speech synthesis section 50, and the speech output start notification signal 140 rises, whereby the second timer 36 is initialized at a time T7.

The speech output start notification signal 140 falls at a time T8, whereby the second timer 36 starts to count up or down.

When the count value of the second timer 36 has reached a specific value set in advance at a time T9, the speech synthesis section 50 starts the speech synthesis process and starts to output the synthesized speech signal 310 to the speaker 300, and the speech output period signal 150 rises.

When the speech synthesis section 50 has finished outputting the speech signal 310 corresponding to the final text data to the speaker 300 at a time T10, for example, the speech output period signal 150 falls.

The speech output finish signal 160 rises at a time T11 and falls at a time T12, whereby the speech synthesis process is completed.

Figure 4:
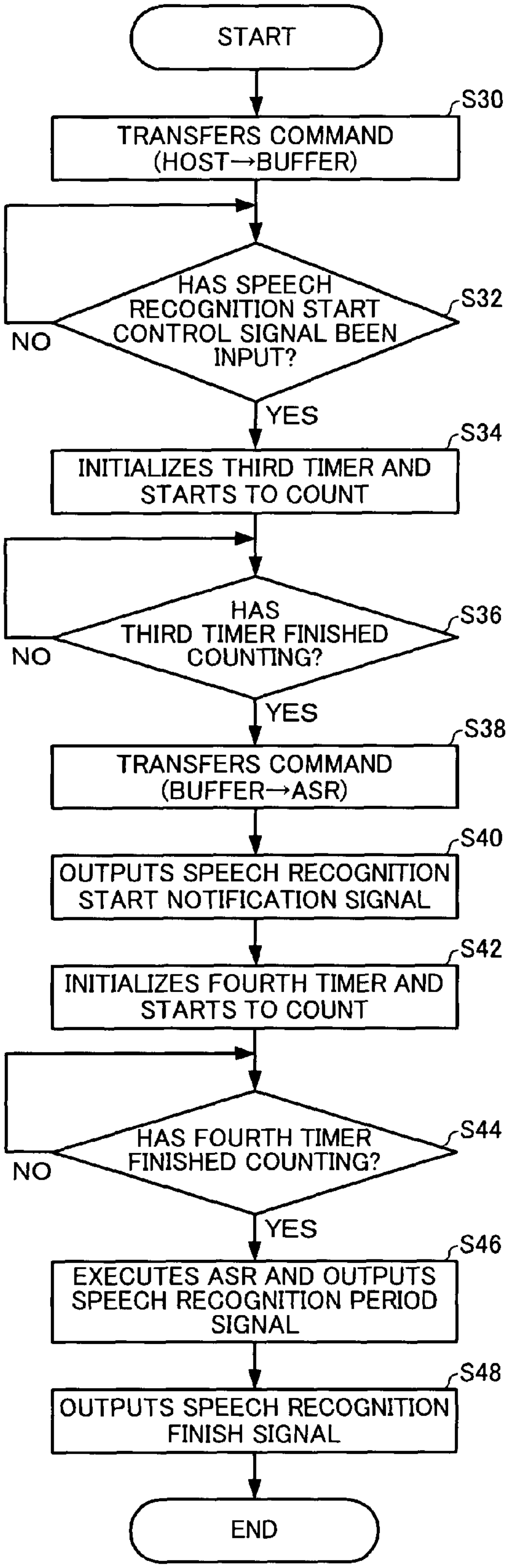
FIG. 4 is a flowchart illustrative of the execution flow of a speech recognition process of a semiconductor integrated circuit device according to one embodiment of the invention.

FIG. 4 is a flowchart illustrative of the execution flow of the speech recognition process of the semiconductor integrated circuit device according to this embodiment.

The execution flow of the speech recognition process of the semiconductor integrated circuit device 100 according to this embodiment is described below with reference to FIGS. 1 and 4.

The host 200 transmits the command relating to the speech recognition process to the semiconductor integrated circuit device 100 through the host interface, and the semiconductor integrated circuit device 100 stores the command in the ASR command buffer 14 (step S30).

The semiconductor integrated circuit device 100 waits for the speech recognition start control signal 120 to be input from the outside (step S32). When the speech recognition start control signal 120 has been input, the control section 20 initializes the third timer 40 and starts to count up or down (step S34).

When the count value of the third timer 40 has reached a specific value set in advance (step S36), the command stored in the ASR command buffer 14 is transferred to the speech recognition section 60 (step S38), and the speech recognition section 60 outputs the speech recognition start notification signal 170 (step S40).

After outputting the speech recognition start notification signal 170, the speech recognition section 60 initializes the fourth timer 46 and starts to count up or down (step S42).

When the count value of the fourth timer 46 has reached a specific value set in advance (step S44), the speech recognition section 60 starts to output the speech recognition period signal 180 and starts the speech recognition process for the speech signal input from the microphone 400. When the speech recognition section 60 has recognized a specific word set in advance, for example, the speech recognition section 60 finishes outputting the speech recognition period signal 180 (step S46).

When the speech recognition section 60 has recognized a specific word set in advance, for example, the speech recognition section 60 transmits the speech recognition result data to the host 200 through the host interface section 10, and outputs the speech recognition finish signal 190 to finish the speech recognition process (step S48).

Figure 5:
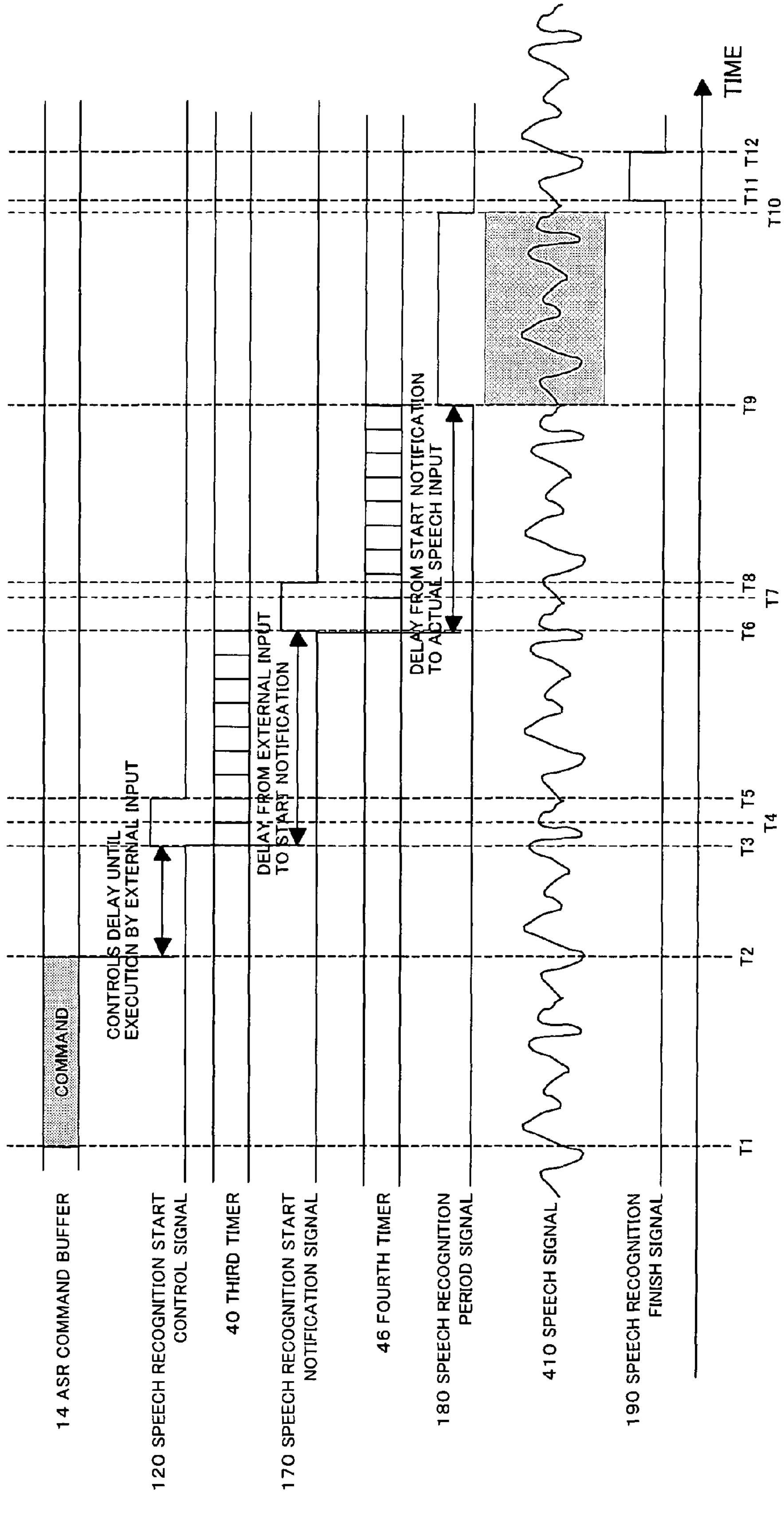
FIG. 5 is a timing chart illustrative of the generation timing of each signal during a speech recognition process of a semiconductor integrated circuit device according to one embodiment of the invention.

FIG. 5 is a timing chart illustrative of the generation timing of each signal during the speech recognition process of the semiconductor integrated circuit device according to this embodiment.

The generation timing of each signal during the speech recognition process of the semiconductor integrated circuit device 100 according to this embodiment is described below with reference to FIGS. 1 and 5.

At times T1 and T2, the host 200 transmits the command relating to the speech recognition process to the semiconductor integrated circuit device 100 through the host interface, and the semiconductor integrated circuit device 100 stores the command in the ASR command buffer 14.

When the recognition start control signal 120 input from the outside rises at a time T3, the third timer 40 is initialized at a time T4.

The speech recognition start control signal 120 falls at a time T5, whereby the third timer 40 starts to count up or down.

When the count value of the third timer 40 has reached a specific value set in advance at a time T6, the command stored in the ASR command buffer 14 is transferred to the speech recognition section 60 and the speech recognition start notification signal 170 rises, whereby the fourth timer 46 is initialized at a time T7.

The speech recognition start notification signal 170 falls at a time T8, whereby the fourth timer 46 starts to count up.

When the count value of the fourth timer 46 has reached a specific value set in advance at a time T9, the speech recognition section 60 starts the speech recognition process for the speech signal 410 input from the microphone 400, and the speech recognition period signal 180 rises.

When the speech recognition section 60 has recognized a specific word set in advance at a time T10, for example, the speech recognition period signal 180 falls.

The speech recognition finish signal 190 rises at a time T11 and falls at a time T12, whereby the speech recognition process is completed.

Figure 6:
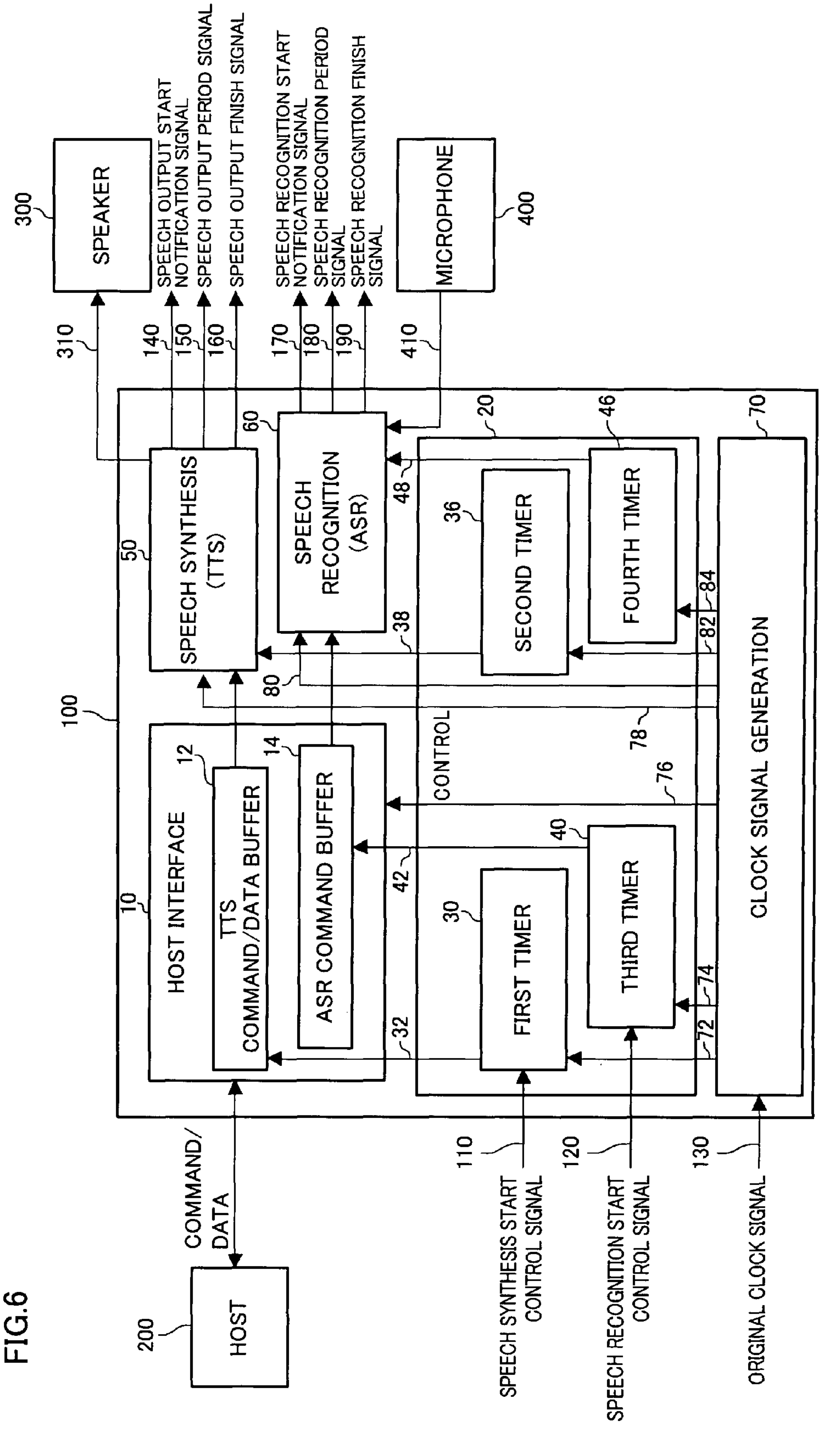
FIG. 6 is a diagram showing a signal connection example which allows a semiconductor integrated circuit device according to one embodiment of the invention to perform a speech synthesis process and a speech recognition process in combination.

FIG. 6 is a diagram showing a signal connection example which allows the semiconductor integrated circuit device according to this embodiment to perform the speech synthesis process and the speech recognition process in combination. The same sections as in FIG. 1 are indicated by the same symbols. Description of these sections is omitted.

In FIG. 6, the speech output finish signal 160 is used as the speech recognition start control signal 120. Since the speech synthesis section 50 outputs the speech output finish signal 160 when the speech synthesis section 50 has finished the speech synthesis process and output of the synthesized speech signal 310, speech recognition can be reliably started after completion of the speech output by utilizing the speech output finish signal 160 as the speech recognition start control signal 120. This prevents a malfunction of the system which occurs when the speech recognition section 60 erroneously recognizes the speech sound produced from the speaker 300 based on the synthesized speech signal 310 and transfers wrong recognition results to the host.

When employing the signal connection configuration shown in FIG. 6, after starting the speech synthesis process using the input of the speech synthesis start control signal as a trigger, the speech recognition process can be automatically started after completion of the speech synthesis process. This makes it unnecessary for the host to take part in the transition from the speech synthesis process to the speech recognition process, whereby the load of the host can be reduced. Moreover, the speech synthesis process and the speech recognition process can be more easily combined.

Figure 7:
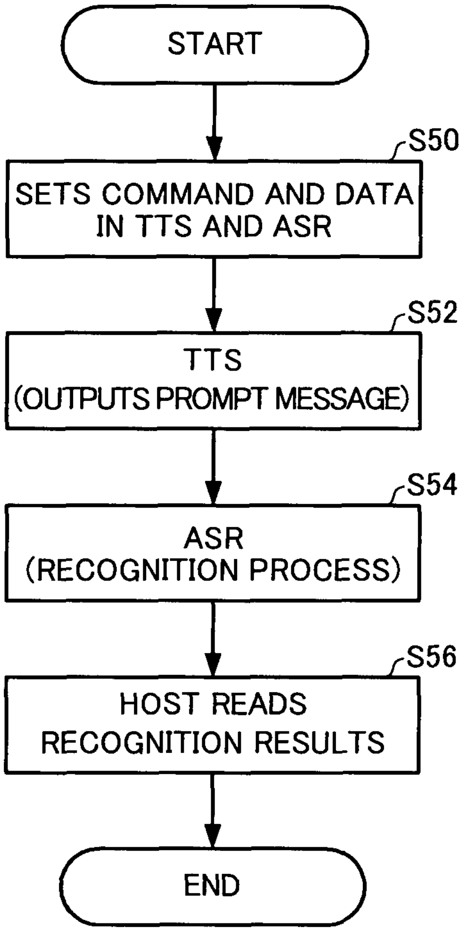
FIG. 7 is a flowchart illustrative of the execution flow when a semiconductor integrated circuit device according to one embodiment of the invention performs a speech synthesis process and a speech recognition process in combination.

FIG. 7 is a flowchart illustrative of the execution flow when the semiconductor integrated circuit device according to this embodiment employing the signal connection configuration shown in FIG. 6 performs the speech synthesis process and the speech recognition process in combination.

The execution flow when the semiconductor integrated circuit device 100 according to this embodiment performs the speech synthesis process and the speech recognition process in combination is described below with reference to FIGS. 6 and 7.

The host 200 transmits the command and data relating to the speech synthesis process and the command relating to the speech recognition process to the semiconductor integrated circuit device 100 through the host interface, and the semiconductor integrated circuit device 100 stores the command and the text data in the TTS command/data buffer 12 and the ASR command buffer 14 (step S50). For example, when synthesizing a speech sound of a sentence “Please answer by yes or no”, a command for writing necessary phoneme segment data into an internal RAM (not shown), a command which directs start of the speech synthesis process, and text data are stored in the TTS command/data buffer 12. When recognizing a speech sound “yes” or “no”, a command which directs recognition of the speech sound “yes” or “no” and a command which directs start of speech recognition are stored in the ASR command buffer 14.

When the speech synthesis start control signal 110 has been input from the outside, the control section 20 causes the first timer 30 to start to count up or down. When the count value of the first timer 30 has reached a specific value set in advance, the control section 20 transfers the command and the text stored in the TTS command/data buffer 12 to the speech synthesis section 50. The speech synthesis section 50 outputs the speech output start notification signal 140 and starts speech synthesis. When the count value of the second timer 36 has reached a specific value set in advance, the speech synthesis section 50 outputs the synthesized speech signal to output a speech sound of a prompt message “Please answer by yes or no”, for example (step S52). The speech output finish signal 160 is used as the speech recognition start control signal for a speech recognition start trigger input so that the speech recognition section 60 does not perform the speech recognition process in the period in which the speech synthesis section 50 outputs the prompt message.

Since the speech synthesis section 50 outputs the speech output finish signal 160 upon completion of the speech output, the command is transferred from the ASR command buffer 14 to the speech recognition section 60 by utilizing the speech output finish signal 160 as the speech recognition start control signal, whereby the speech recognition section 60 starts speech recognition (step S54).

After the speech recognition section 60 has recognized a user’s speech sound “yes” or “no”, for example, the host 200 reads the recognition results (step S56). A series of combined operations of the speech synthesis process and the speech recognition process is thus completed. Since the host need not take part in the transition from the speech synthesis process to the speech recognition process, the load of the host can be reduced, and the speech synthesis process and the speech recognition process can be more easily combined.

2. Electronic Instrument

Figure 8:
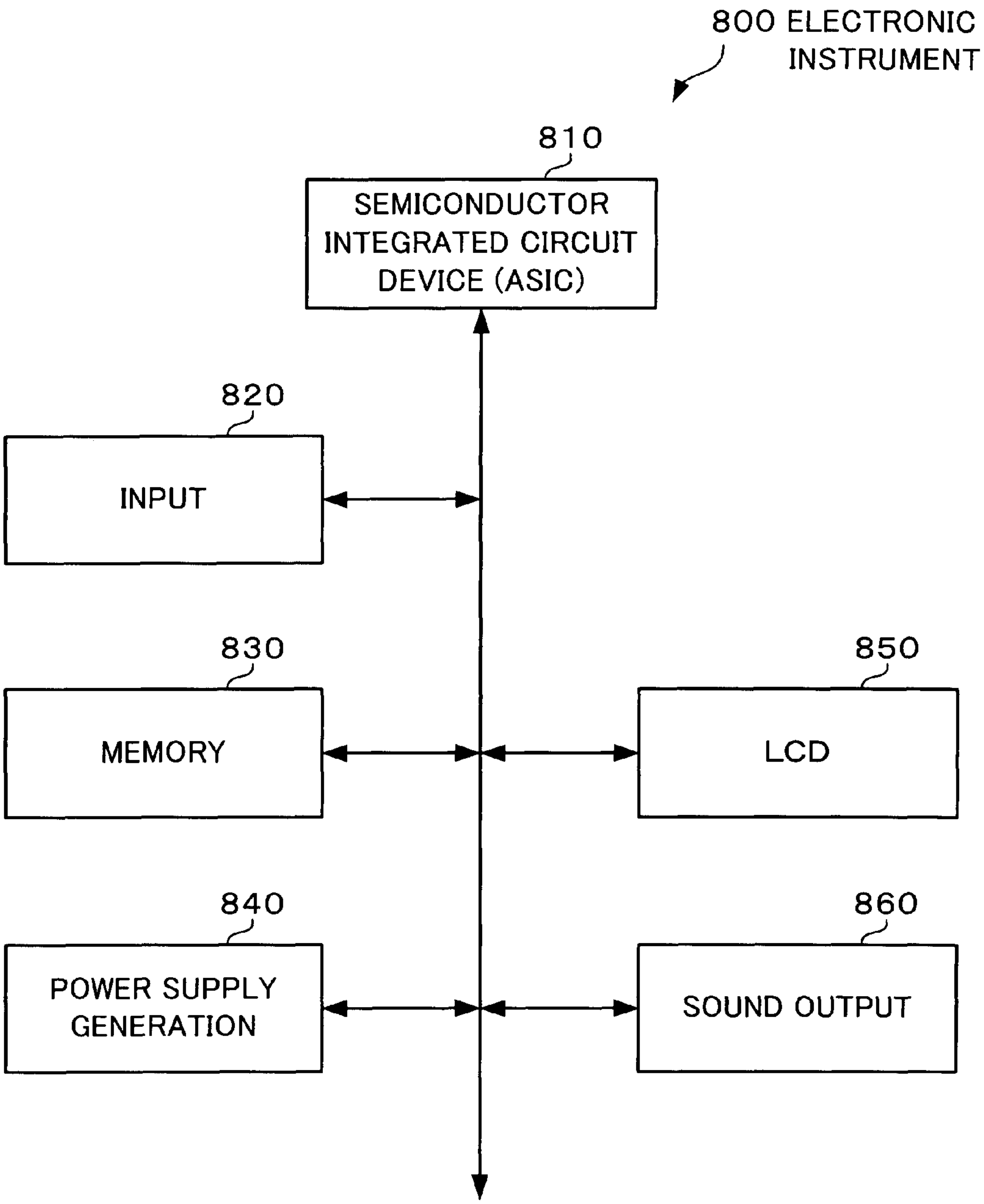
FIG. 8 shows an example of a block diagram of an electronic instrument including a semiconductor integrated circuit device.

FIG. 8 shows an example of a block diagram of an electronic instrument according to this embodiment. An electronic instrument 800 includes a semiconductor integrated circuit device (ASIC) 810, an input section 820, a memory 830, a power supply generation section 840, an LCD 850, and a sound output section 860.

The input section 820 is used to input various types of data. The semiconductor integrated circuit device 810 performs various processes based on the data input using the input section 820. The memory 830 functions as a work area for the semiconductor integrated circuit device 810 and the like. The power supply generation section 840 generates various power supplies used in the electronic instrument 800. The LCD 850 is used to output various images (e.g. character, icon, and graphic) displayed by the electronic instrument.

The sound output section 860 is used to output various types of sound (e.g. voice and game sound) output from the electronic instrument 800. The function of the sound output section 860 may be implemented by hardware such as a speaker.

Figure 9A:
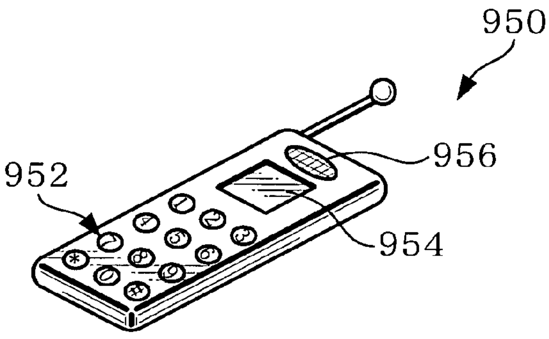
FIGS. 9A to 9C show examples of outside views of various electronic instruments.

FIG. 9A shows an example of an outside view of a portable telephone 950 which is one type of electronic instrument. The portable telephone 950 includes dial buttons 952 which function as the input section, an LCD 954 which displays a telephone number, a name, an icon, and the like, and a speaker 956 which functions as the sound output section and outputs voice.

Figure 9B:
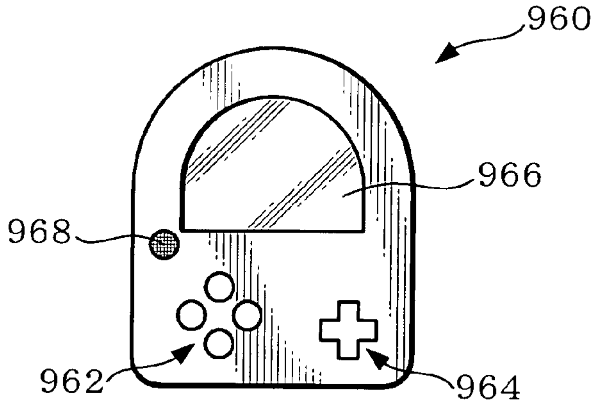

FIG. 9B shows an example of an outside view of a portable game device 960 which is one type of electronic instrument. The portable game device 960 includes operation buttons 962 which function as the input section, an arrow key 964, an LCD 966 which displays a game image, and a speaker 968 which functions as the sound output section and outputs game sound.

Figure 9C:
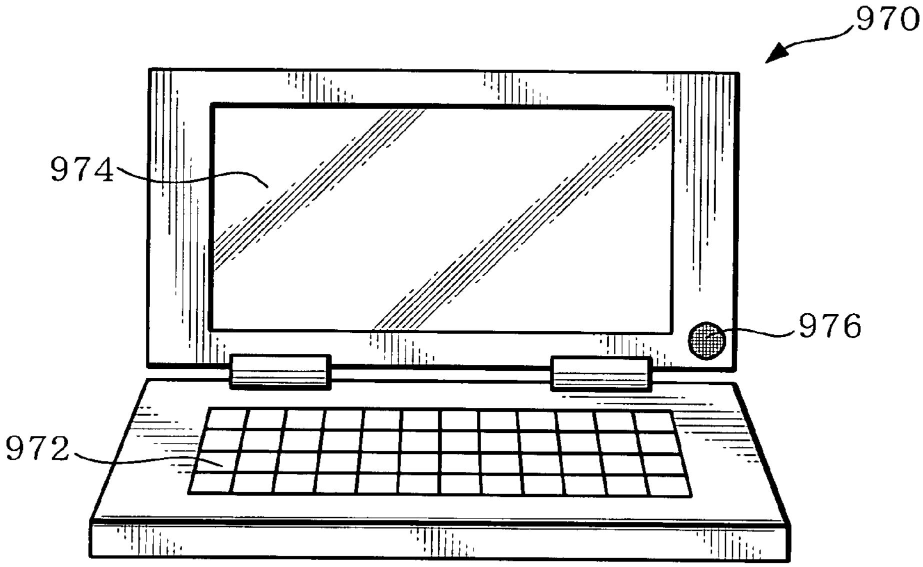

FIG. 9C shows an example of an outside view of a personal computer 970 which is one type of electronic instrument. The personal computer 970 includes a keyboard 972 which functions as the input section, an LCD 974 which displays a character, a figure, a graphic, and the like, and a sound output section 976.

A highly cost-effective electronic instrument with low power consumption can be provided by incorporating the semiconductor integrated circuit device according to this embodiment in the electronic instruments shown in FIGS. 9A to 9C.

As examples of the electronic instrument for which this embodiment can be utilized, various electronic instruments using an LCD such as a personal digital assistant, a pager, an electronic desk calculator, a device provided with a touch panel, a projector, a word processor, a viewfinder or direct-viewfinder video tape recorder, and a car navigation system can be given in addition to the electronic instruments shown in FIGS. 9A to 9C.

The invention is not limited to the above-described embodiments, and various modifications can be made within the scope of the invention. The invention includes various other configurations substantially the same as the configurations described in the embodiments (in function, method and result, or in objective and result, for example). The invention also includes a configuration in which an unsubstantial portion in the described embodiments is replaced. The invention also includes a configuration having the same effects as the configurations described in the embodiments, or a configuration able to achieve the same objective. Further, the invention includes a configuration in which a publicly known technique is added to the configurations in the embodiments.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A semiconductor integrated circuit device comprising:

a storage section that temporarily stores a command and text data input from the outside;

a speech synthesis section that synthesizes a speech signal corresponding to the text data based on the command and the text data stored in the storage section, and outputs the synthesized speech signal to the outside; and a control section that controls a timing at which the command and the text data stored in the storage section are transferred to the speech synthesis section, the control section controlling outputting a speech output start notification signal that notifies in advance a start of outputting the synthesized speech signal to the outside based on an occurrence of a speech synthesis start event, the control section including a timer that measures a first given time after the occurrence of the speech synthesis start event, the control section controlling the speech synthesis section to output the start notification signal after the timer has measured the first given time, the timer measuring a second given time after the start notification signal, and the control section controlling the speech synthesis section to start to output the synthesized speech signal after the timer has measured the second given time.

2. The semiconductor integrated circuit device as defined in claim 1, the control section controlling an output of a speech output period signal that indicates a period from the start to the end of the output of the synthesized speech signal to the outside.

3. The semiconductor integrated circuit device as defined in claim 2, the control section controlling an output of a speech output finish signal that indicates the end of the output of the synthesized speech signal to the outside based on an occurrence of a speech synthesis finish event.

4. The semiconductor integrated circuit device as defined in claim 1, the control section controlling an output of a speech output finish signal that indicates the end of the output of the synthesized speech signal to the outside based on an occurrence of a speech synthesis finish event.

5. A semiconductor integrated circuit device comprising:

a speech synthesis section that synthesizes a speech signal corresponding to text data based on a command and text data input from the outside, and outputs the synthesized speech signal to the outside; and a control section that controls outputting a speech output start notification signal that notifies in advance a start of outputting the synthesized speech signal to the outside based on an occurrence of a speech synthesis start event, the control section including a timer that measures a first given time after the occurrence of the speech synthesis start event, the control section controlling the speech synthesis section to output the start notification signal after the timer has measured the first given time, the timer measuring a second given time after the start notification signal, and the control section controlling the speech synthesis section to start to output the synthesized speech signal after the timer has measured the second given time.

6. The semiconductor integrated circuit device as defined in claim 5, the control section controlling an output of a speech output finish signal that indicates the end of the output of the synthesized speech signal to the outside based on an occurrence of a speech synthesis finish event.

7. The semiconductor integrated circuit device as defined in claim 5, the control section controlling an output of a speech output period signal that indicates a period from the start to the end of the output of the synthesized speech signal to the outside.

8. The semiconductor integrated circuit device as defined in claim 7, the control section controlling an output of a speech output finish signal that indicates the end of the output of the synthesized speech signal to the outside based on an occurrence of a speech synthesis finish event.

9. A semiconductor integrated circuit device comprising:

a storage section that temporarily stores a command and text data input from the outside;

a speech synthesis section that synthesizes a speech signal corresponding to the text data based on the command and the text data stored in the storage section, and outputs the synthesized speech signal to the outside;

a control section that controls a timing at which the command and the text data stored in the storage section are transferred to the speech synthesis section; and a speech recognition section that recognizes speech data input from the outside based on a command relating to a speech recognition process stored in the storage section, the speech synthesis section synthesizing the speech signal corresponding to the text data based on a command relating to a speech synthesis process stored in the storage section and text data relating to the speech synthesis process stored in the storage section, and outputting the synthesized speech signal to the outside, and the control section controlling the timing at which the command relating to the speech synthesis process stored in the storage section and the text data relating to the speech synthesis process stored in the storage section are transferred to the speech synthesis section based on a speech synthesis start control signal, controlling generating a speech output finish signal that indicates the end of the output of the synthesized speech signal based on an occurrence of a speech synthesis finish event, and controlling a timing at which the command relating to the speech recognition process stored in the storage section is transferred to the speech recognition section based on the speech output finish signal.

10. An electronic instrument comprising:

the semiconductor integrated circuit device as defined in claim 1;

means that receives input information; and means that outputs a result of a process performed by the semiconductor integrated circuit device based on the input information.

11. An electronic instrument comprising:

the semiconductor integrated circuit device as defined in claim 5;

means that receives input information; and means that outputs a result of a process performed by the semiconductor integrated circuit device based on the input information.

12. An electronic instrument comprising:

the semiconductor integrated circuit device as defined in claim 9;

a means that receives input information; and a means that outputs a result of a process performed by the semiconductor integrated circuit device based on the input information.

* * * * *